Nov. 26, 1935.    R. S. SANFORD    2,021,897

CLUTCH CONTROL MECHANISM

Filed Aug. 14, 1931

INVENTOR.
ROY S. SANFORD
BY
*Jn. W. McCowley*
ATTORNEY.

Patented Nov. 26, 1935

2,021,897

UNITED STATES PATENT OFFICE 2,021,897

CLUTCH CONTROL MECHANISM

Roy S. Sanford, South Bend, Ind., assignor to Bragg-Kliesrath Corporation, South Bend, Ind., a corporation of New York Application August 14, 1931, Serial No. 557,136

10 Claims. (Cl. 192—.01)

This invention relates to clutches, and is illustrated as embodied in novel mechanism for the automatic operation of an automobile clutch.

One object of the invention is to arrange a clutch control, preferably of the vacuum type and with the power controlled by the accelerator pedal which actuates the engine throttle, in such a manner that it can be operated manually, when desired, by a clutch pedal or the like which has a one-way engagement therewith so that it is not affected by the power operation of the clutch. If desired, this pedal may be the usual service pedal operating the braking system of the car.

Another feature of the invention relates to providing a simple and accessible means for modifying the action of the clutch-controlling valve, preferably arranged to be adjustable to vary the action and especially the timing of the valve with respect to the operation of the throttle.

The above and other objects and features of the invention, including various novel combinations of parts and desirable particular constructions, will be apparent from the following description of the illustrative embodiment shown in the accompanying drawing, in which.

Figure 1:
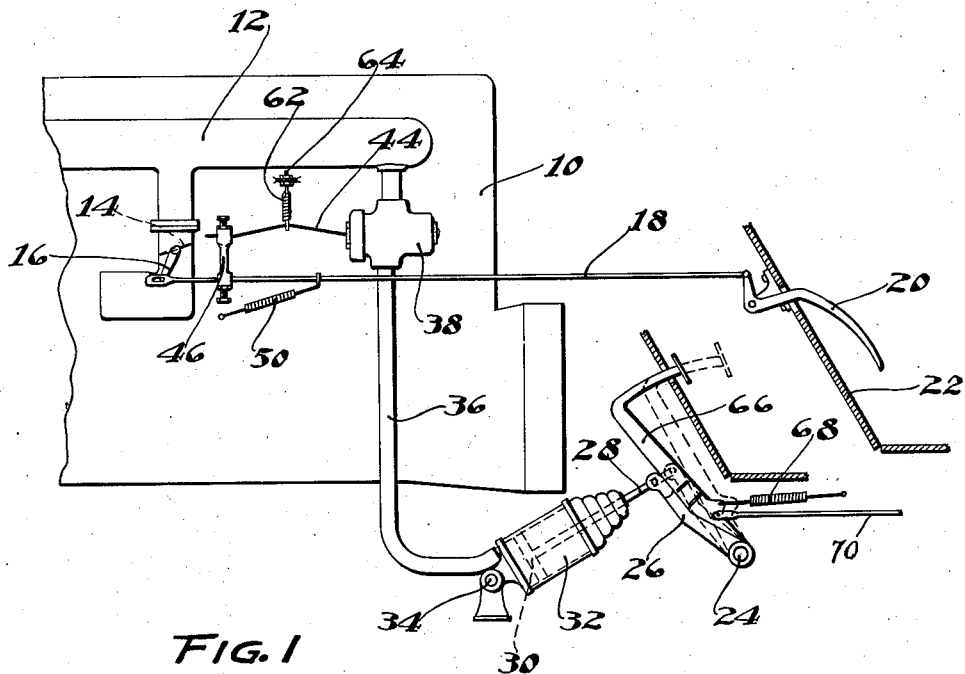
Figure 1 is a diagrammatic longitudinal section through part of an automobile chassis, showing the clutch control in side elevation.

In the arrangement illustrated, the automobile engine is indicated at 10, being provided with the usual intake manifold 12 and controlled by the usual butterfly valve or throttle 14 operated by an arm 16. The throttle arm 16 is operatively connected, (preferably by means of a slotted or other one-way connection) by means of a rod or wire or the like 18, to an accelerator pedal or other control 20, shown pivoted on the floorboard 22. The throttle may also of course be independently controlled by the usual throttle lever on the steering wheel (not shown).

The clutch, which may be of any usual form and which is therefore not illustrated per se, may be operated by the usual control shaft 24 on which is fixed an actuating device such as a lever 26, shown arranged below the floorboard. Lever 26 is illustrated as connected, by means such as a pivoted connecting rod 28, to a piston 30 or the equivalent (e. g. a diaphragm or the like) arranged in a cylinder 32 pivoted at 34 to a fixed bracket.

Figures 2, 3:
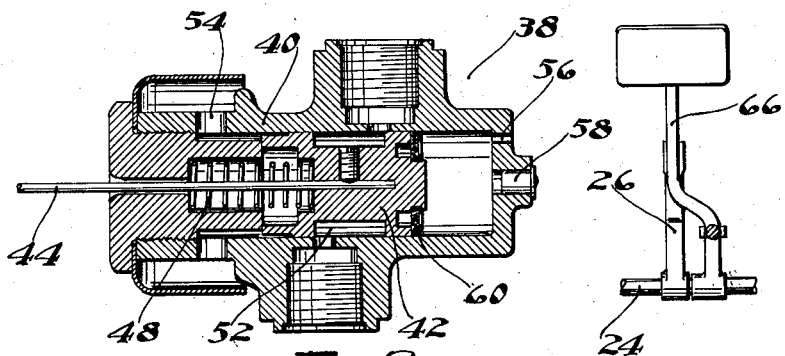
Figure 2 is a section through the clutch control valve.
Figure 3 is an elevation of the clutch operating lever and the brake pedal, indicating the one-way connection therebetween.

Cylinder 32 is connected to the manifold 12 by a conduit 36 controlled by a valve 38 shown in detail in Figure 2. The particular valve illustrated, which is more particularly described and claimed in an application of Victor W. Kliesrath No. 568,081, filed October 10, 1931, includes a casing 40 forming a valve cylinder, and within which is arranged a valve piston 42 connected by a wire or the like flexible connection 44 to a bracket 46 fixedly (and adjustably) secured to the throttle rod 18. The valve piston 42 is actuated by tension on connection 44, against the resistance of a valve spring 48 which is lighter than the throttle return spring 50.

In its position which it assumes when the accelerator pedal 20 is released by the driver, and which is shown in Figure 3, the throttle return spring 50 overcomes the valve spring 48 and holds the valve piston in the position shown, with an annular passage 52 establishing communication between the manifold 12 and the conduit 36. The lever 26 is therefore held down, with the clutch thrown out, by the vacuum power device 30—32.

If the accelerator pedal is depressed, valve spring 48 is permitted to shift the valve piston to the right, cutting off communication with the manifold and establishing communication between conduit 36 and the atmosphere through passages 54. A vent 56 facilitates movement of the valve piston. An inwardly-opening check valve 58 may be provided, if desired, so that vent 56 may be made small enough so that movement of the valve piston to the left will be practically unobstructed, whereas movement to the right will be relatively sluggish. A friction disk 60, slidingly engaging the valve cylinder wall, also acts to give a substantially uniform movement of the valve to the right, regardless of how slowly or rapidly the accelerator 20 is depressed.

According to an important feature of the invention, the valve action and especially the timing is modified by means such as a spring 62, acting transversely and resiliently on connection 44, and which is arranged to be adjusted as to tension by means of a threaded eyebolt or the like 64, by means of which the upper end of the spring is attached to a fixed bracket.

Figure 4:
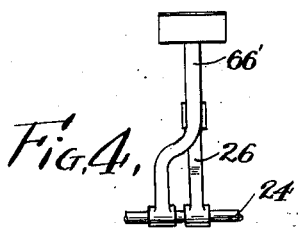
Figure 4 is a similar view, showing the connection between the clutch operating lever and a manually operable pedal for operating the clutch.

The above description will make clear the power operation of the clutch, under the control of the accelerator pedal or its equivalent. It is desirable that some auxiliary means be provided for manually operating the clutch in case of a failure of the power mechanism. To this end I provide a separate pedal 66', disclosed in Figure 4, shown loosely sleeved on the clutch shaft 24 and projecting through the floorboard 22. This pedal is operable, against the resistance of a return spring 68, into one-way engagement with the lever 26, so that while the pedal can operate the lever, the lever cannot operate the pedal.

While this may be purely a clutch pedal, if preferred it may be the usual service brake pedal 66, as disclosed in Figure 3, having a connection 70 to the four-wheel brake system. In this case the movement of the pedal should disengage the clutch before beginning to apply the brakes.

While one illustrative embodiment has been described in detail, it is not my intention to limit the scope of the invention to that particular embodiment, or otherwise than by the terms of the appended claims.

I claim:

1. A vehicle having a clutch control including a valve, throttle control means, a flexible connection from said means to the valve, and a tension spring fixed at one end and connected to act at its other end transversely on said connection to modify the action of the valve.

2. A vehicle having a clutch control including a valve, throttle control means, a flexible connection from said means to the valve, and means arranged to act resiliently transversely on said connection to modify the action of the valve.

3. A vehicle having a clutch control including a valve, throttle control means, a flexible connection from said means to the valve, and means arranged to act resiliently transversely on said connection to modify the action of the valve, together with means for adjusting the tension of said resiliently-acting means.

4. A clutch control valve having a tension operating connection with means acting transversely and resiliently on said connection to modify the valve action.

5. A clutch control valve having a tension operating connection with a part moving transversely thereof and acting on said connection to modify the valve action.

6. An automotive vehicle provided with an internal-combustion engine and a clutch, fluid power means for operating said clutch, a control valve for said power means, throttle control means for said engine, an operative connection between said throttle control means and said valve, said connection including yieldable means for determining the relative time of operation of said throttle with respect to said valve.

7. An automotive vehicle provided with an internal-combustion engine and a clutch, fluid power means for operating said clutch, a control valve for said power means, throttle control means for said engine, an operative connection between said throttle control means and said valve, said connection including adjustable spring means for determining the relative time of operation of said throttle with respect to said valve.

8. An automotive vehicle having a clutch control including a valve, said valve comprising a spring, throttle control means, means interconnecting said throttle control means and said valve, said connecting means including a spring operable to regulate the operation of the valve.

9. An automotive vehicle having a clutch control including a valve, said valve comprising a spring, throttle control means, means interconnecting said throttle control means and said valve, said connecting means including a flexible connection and a spring secured to said flexible connection, the spring being operable to regulate the operation of the valve.

10. An automotive vehicle provided with a clutch control including a control valve therefor, a spring within the valve for operating the same, said vehicle being further provided with an internal-combustion engine, throttle control means for said engine, said means including a lost motion connection, spring means acting upon said throttle control means tending to close the throttle, means interconnecting said throttle control means and said clutch valve, said latter means including a spring, the relative strengths of the three aforementioned springs being such as to predetermine, in conjunction with said lost motion connection, the relative timing of the operation of the throttle and clutch.

ROY S. SANFORD.